US011232220B2

(12) United States Patent
Thibadeau, Sr. et al.

(10) Patent No.: US 11,232,220 B2
(45) Date of Patent: Jan. 25, 2022

(54) ENCRYPTION MANAGEMENT FOR STORAGE DEVICES

(71) Applicant: Antique Books, Inc., Pittsburgh, PA (US)

(72) Inventors: Robert H. Thibadeau, Sr., Pittsburgh, PA (US); Justin D. Donnell, Verona, PA (US)

(73) Assignee: Antique Books, Inc., Pittsburgh, PA (US)

( * ) Notice: Subject to any disclaimer, the term of this patent is extended or adjusted under 35 U.S.C. 154(b) by 0 days.

(21) Appl. No.: 15/571,962

(22) PCT Filed: May 9, 2016

(86) PCT No.: PCT/US2016/031484
§ 371 (c)(1),
(2) Date: Nov. 6, 2017

(87) PCT Pub. No.: WO2016/179590
PCT Pub. Date: Nov. 10, 2016

(65) Prior Publication Data
US 2018/0121670 A1     May 3, 2018

Related U.S. Application Data

(60) Provisional application No. 62/158,055, filed on May 7, 2015.

(51) Int. Cl.
*G06F 21/00* (2013.01)
*G06F 21/62* (2013.01)
(Continued)

(52) U.S. Cl.
CPC .......... *G06F 21/6218* (2013.01); *G06F 21/31* (2013.01); *G06F 21/604* (2013.01);
(Continued)

(58) Field of Classification Search
CPC ..... G06F 21/6218; G06F 21/31; G06F 21/604
See application file for complete search history.

(56) References Cited

U.S. PATENT DOCUMENTS 7,962,755 B2 *   6/2011   Pizano .................... G06F 21/32
                                                                                            713/186
8,813,183 B2    8/2014   Thibadeau et al.
(Continued)

FOREIGN PATENT DOCUMENTS

WO      2014165431 A1    10/2014
WO      2016141178 A1    9/2016

OTHER PUBLICATIONS

International Search Report and Written Opinion for PCT/US2016/031484, dated Jul. 29, 2016, 10 pages.
(Continued)

*Primary Examiner* — Jeffrey C Pwu
*Assistant Examiner* — Rodman Alexander Mahmoudi
(74) *Attorney, Agent, or Firm* — Withrow & Terranova, PLLC

(57) ABSTRACT

Systems and methods for encryption management for storage devices are disclosed. A method of operation of a storage device includes receiving a first request from a client device by a user for a first interaction and authenticating that the user is permitted for the first interaction with the storage device. The method includes receiving a second request for a second interaction with the storage device and performing advanced capabilities testing on the user based on the second interaction. Based on the advanced capabilities testing, the method includes permitting the user to complete the second interaction. In this way, additional safeguards may be provided to prevent the unintentional damage or destruction of data stored on the storage device. This may include testing that the user is in the right state of mind and/or ensuring that (Continued)

the user is aware of the consequences of the requested interaction with the storage device.

18 Claims, 8 Drawing Sheets

(51) Int. Cl.
  *G06F 21/31* (2013.01)
  *H04L 9/32* (2006.01)
  *H04L 29/06* (2006.01)
  *G06F 21/60* (2013.01)
  *H04L 9/08* (2006.01)

(52) U.S. Cl.
  CPC .......... *H04L 9/0894* (2013.01); *H04L 9/3213* (2013.01); *H04L 63/0807* (2013.01); *H04L 63/10* (2013.01); *G06F 2221/2137* (2013.01)

(56) References Cited

U.S. PATENT DOCUMENTS

| | | |
|---|---|---|
| 2006/0242065 A1* | 10/2006 | Jogand-Coulomb ... G06F 21/10 705/50 |
| 2008/0177569 A1 | 7/2008 | Chen et al. |
| 2014/0282882 A1 | 9/2014 | Tsui et al. |
| 2014/0289839 A1 | 9/2014 | Chen et al. |
| 2015/0227726 A1* | 8/2015 | Grigg ...................... G06F 21/31 726/7 |
| 2015/0350210 A1 | 12/2015 | Thibadeau, Sr. et al. |
| 2016/0337351 A1* | 11/2016 | Spencer ............... H04L 63/0876 |
| 2016/0337553 A1* | 11/2016 | Sato ........................ B41J 29/00 |

OTHER PUBLICATIONS

Written Opinion of the International Preliminary Examining Authority for PCT/US2016/031484, dated Mar. 30, 2017, 5 pages.
International Preliminary Report on Patentability for PCT/US2016/031484, dated Jul. 5, 2017, 6 pages.

\* cited by examiner

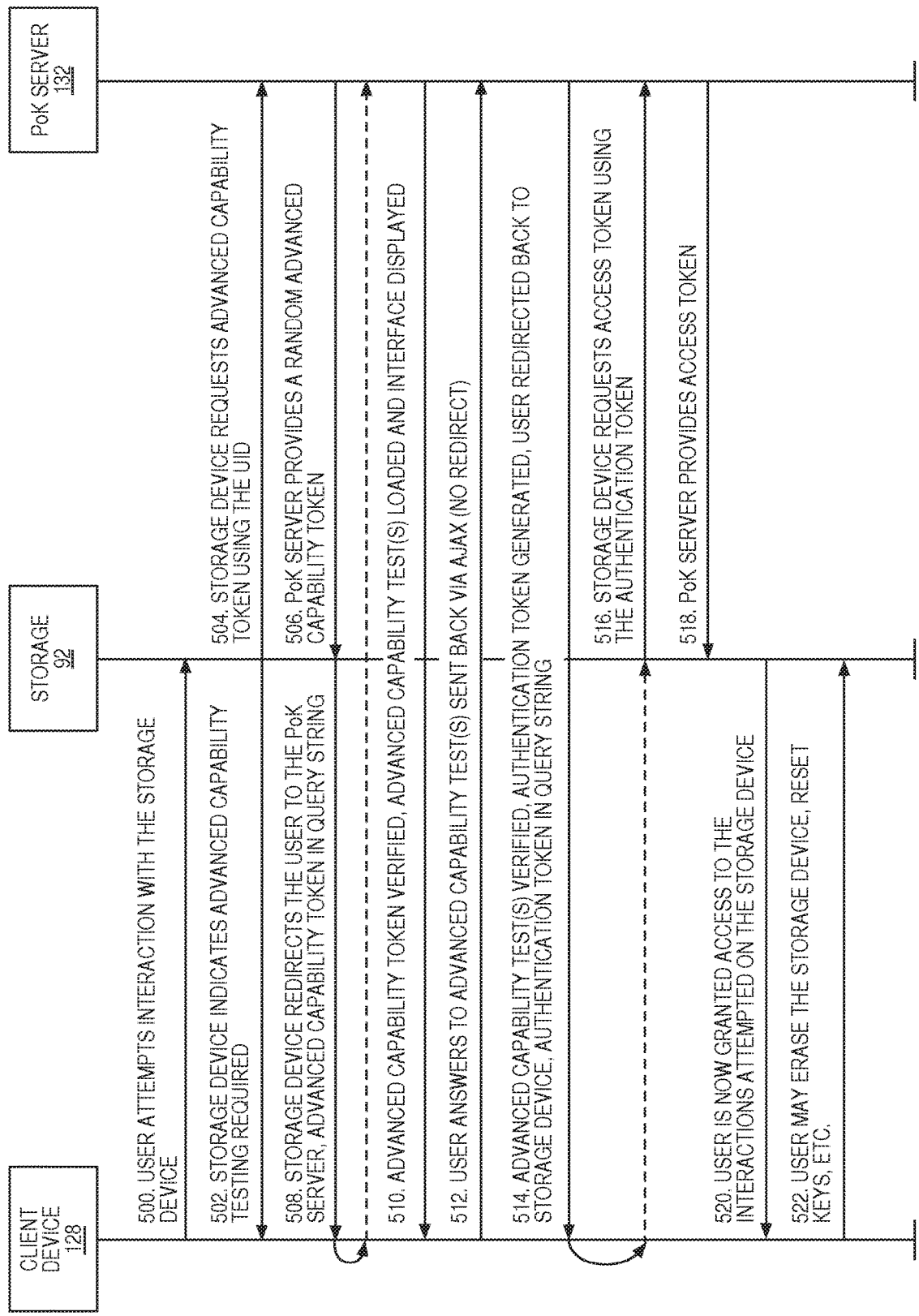

ENCRYPTION MANAGEMENT FOR STORAGE DEVICES

RELATED APPLICATIONS

This application is a 35 U.S.C. § 371 national phase filing of International Application No. PCT/US16/31484, filed May 9, 2016, which claims the benefit of provisional patent application Ser. No. 62/158,055, filed May 7, 2015, the disclosures of which are hereby incorporated herein by reference in their entireties.

FIELD OF THE DISCLOSURE

The present disclosure relates to securing a storage device.

BACKGROUND

In order to prevent data from being accessed by unauthorized users, it may be encrypted. Often one or more keys are required to unencrypt the encrypted data. Without the correct keys or other information, the data cannot be unencrypted. Encryption of data is desirable in many instances where privacy is concerned. In addition, some encryption schemes can ensure that no unauthorized changes have been made to the data or that a version of the data is attested to by some entity (referred to as signing the data).

The management of encryption is often subject to errors, though not intentional or malicious, that can result in the effective loss of data. This can happen in many ways. For example, a user may erase data cryptographically by replacing the encryption key without knowing that this is the only copy of the data, or some part of it. The user may forget his unlock key, or there may be an error in the system that causes the primary key to fail. There are many types of errors that can cause the effective loss of data. Essentially all of them begin with the user logging in, which involves at least a username and a Proof of Knowledge (PoK) such as a password to establish the identity of the user. All of this can and does happen even if encryption management includes backup passwords, administration keys, and the like. As such, there is a need for encryption management for storage devices.

SUMMARY

Systems and methods for encryption management for storage devices are disclosed. In some embodiments, a method of operation of a storage device includes receiving a first request from a client device by a user for a first interaction with the storage device. The method also includes authenticating that the user is permitted for the first interaction with the storage device. The method also includes receiving a second request from the client device for a second interaction with the storage device and performing advanced capabilities testing on the user based on the second interaction. Based on the advanced capabilities testing, the method includes permitting the user to complete the second interaction with the storage device. In this way, additional safeguards may be provided to prevent the unintentional damage or destruction of data stored on the storage device. This may include testing that the user is in the right state of mind and/or ensuring that the user is aware of the consequences of the requested interaction with the storage device.

In some embodiments, authenticating that the user is permitted for the first interaction with the storage device includes querying a proof of knowledge server within the storage device. In some embodiments, authenticating that the user is permitted for the first interaction with the storage device includes querying a proof of knowledge server external to the storage device. In some embodiments, querying the proof of knowledge server includes requesting a login token from the proof of knowledge server corresponding to the user; redirecting the user to the proof of knowledge server including the login token; and receiving an authentication token from the client device.

In some embodiments, performing advanced capabilities testing on the user based on the second interaction includes requesting an advanced capabilities token from the proof of knowledge server corresponding to the user and redirecting the user to the proof of knowledge server including the advanced capabilities token. The method also includes receiving an authentication token from the client device; requesting an access token from the proof of knowledge server using the authentication token; and permitting the user to complete the second interaction with the storage device, which comprises determining that the access token permits the second interaction.

In some embodiments, the access token indicates that the user is permitted to have query-only access to the storage device, read-only access to the storage device, write access to the storage device, and/or erase access to the storage device.

In some embodiments, performing advanced capabilities testing on the user based on the second interaction also includes determining if it is necessary to perform advanced capabilities testing on the user based on at least one of the group consisting of the second interaction with the storage device, a previous advanced capabilities testing, a device used to access to the storage device, and the user. In some embodiments, determining if it is necessary to perform advanced capabilities testing includes determining not to perform advanced capabilities testing if advanced capabilities testing has already been performed successfully within a predefined time period. In some embodiments, the predefined time period is based on the second interaction with the storage device.

In some embodiments, determining if it is necessary to perform advanced capabilities testing includes determining to always perform advanced capabilities testing based on the second interaction with the storage device.

In some embodiments, the storage device is a self-encrypting drive. In some embodiments, the storage device is an entire storage drive, a partition of a storage drive, a file, a storage object, or a document.

In some embodiments, a storage device includes a data storage and circuitry. The circuitry is configured to receive a first request from a client device by a user for a first interaction with the storage device. The circuitry is also configured to authenticate that the user is permitted for the first interaction with the storage device. The circuitry is also configured to receive a second request from the client device for a second interaction with the storage device and perform advanced capabilities testing on the user based on the second interaction. Based on the advanced capabilities testing, the circuitry is configured to permit the user to interact with the storage device as requested In some embodiments, a storage device is adapted to receive a first request from a client device by a user for a first interaction with the storage device. The storage device is also adapted to authenticate that the user is permitted for the first interaction with the storage device. The storage device is also adapted to receive a second request from the client device for a second interaction with the storage device and perform advanced capabilities testing on the user based on the second interaction. Based on the advanced capabilities testing, the storage device is adapted to permit the user to complete the second interaction with the storage device.

In some embodiments, the storage device is adapted to perform any of the preceding methods.

In some embodiments, a computer program includes instructions which, when executed on at least one processor, cause the at least one processor to carry out any of the preceding methods. In some embodiments, a carrier contains the computer program where the carrier is one of an electronic signal, an optical signal, a radio signal, or a computer readable storage medium.

In some embodiments, a storage device includes a communication module operative to receive a first request from a client device by a user for a first interaction with the storage device and a second request from the client device for a second interaction with the storage device. The storage device also includes an authentication module operative to authenticate that the user is permitted for the first interaction with the storage device as requested and an advanced capabilities module operative to perform advanced capabilities testing on the user based on the second interaction with the storage device. The storage device also includes an access module operative to, based on the advanced capabilities testing, permit the user to complete the second interaction with the storage device.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 8 illustrates a user attempting to access a storage device and being subjected to advanced capabilities testing by the PoK server, according to some embodiments of the present disclosure.

DETAILED DESCRIPTION

Figure 1:
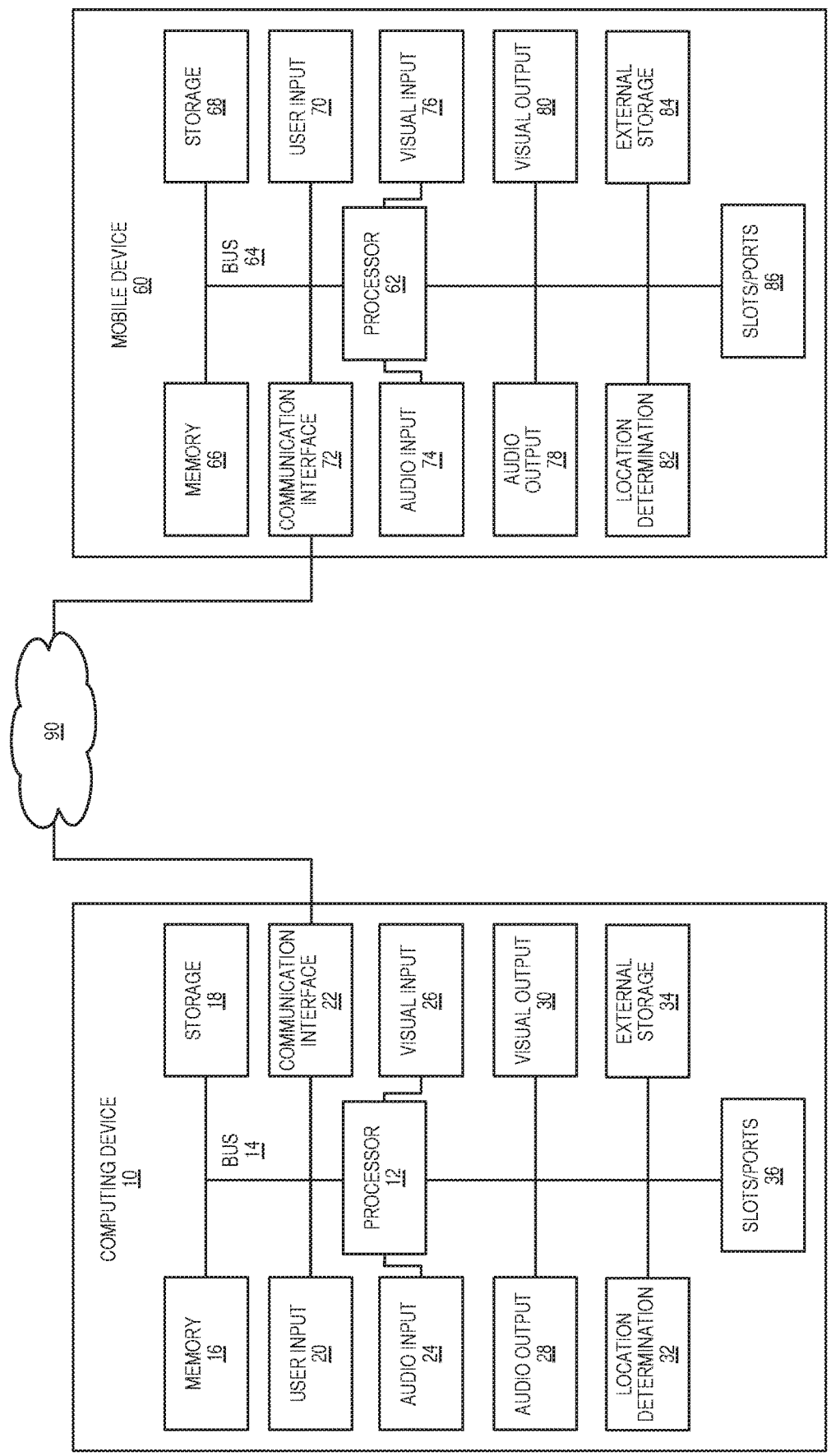
FIG. 1 illustrates an example of a generic computing device and a generic mobile device, according to some embodiments of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

As discussed above, the management of encryption is often subject to errors, though not intentional or malicious, that can result in the effective loss of data. As such, there is a need for encryption management for storage devices. Systems and methods for encryption management for storage devices are disclosed.

In some embodiments, a solution to the errors in encryption management discussed above is presented that relies on privacy and advanced capability testing in the context of the Proof of Knowledge (PoK) required for actions that may result in irrecoverable losses of data or, for example, access to sensitive data when such access is not actually authorized.

In some instances, the effective differences between errors made in managing encryption are similar, if not identical to, errors made in payment systems, and so embodiments of the present disclosure may also be applicable to those systems. Other applications of the embodiments disclosed herein involve sensitive data controls (such as with medical controls of patient data). While these applications may sometimes not expressly involve encryption per se, they do use mechanistically similar components and so embodiments of the present disclosure may also be applicable to those systems.

In some embodiments, a method of operation of a storage device includes receiving a request from a client device by a user to interact with the storage device. The method also includes authenticating that the user is permitted to interact with the storage device as requested and performing advanced capabilities testing on the user based on the interaction with the storage device requested. Based on the authentication and advanced capabilities testing, the method includes permitting the user to interact with the storage device as requested. In this way, additional safeguards may be provided to prevent the unintentional damage or destruction of data stored on the storage device. This may include testing that the user is in the right state of mind and/or ensuring that the user is aware of the consequences of the requested interaction with the storage device.

In some embodiments, a PoK server is used. As used herein, the term server is not limited to being a separate entity from other devices. Instead, the term server indicates that a service is provided whether this is locally or over some type of communications network as will be discussed in more detail below. An exemplary PoK Software as a Service (SaaS) server was previously described in International Patent Publication Number WO/2014/165431 entitled "Method and System Providing a Picture Password Proof of Knowledge," the disclosure of which is hereby incorporated herein by reference in its entirety. Also, a generalized PoK service that includes not only a PoK to establish user identity which is separate from the knowledge of the identity, but also advanced capability testing was previously described in U.S. Pat. No. 8,813,183 entitled "Method and System for Processor or Web Logon," the disclosure of which is hereby incorporated herein by reference in its entirety.

Some terms that are used herein are defined as follows. An Object (OBJ) can be an entire storage drive, partitions on that drive, files, or proper storage objects as in T10 International Organization for Standardization (ISO) Object-Based Storage Device (OSD). Other types of objects are also possible. For example, a document could have sentences in it that are separately encrypted as a single object.

A Media Encryption Key (MEK) is the actual encryption and/or decryption key employed by the encryption algorithm. Both Symmetric Key and Asymmetric Key cryptography can have one or more MEKs.

A Key Encryption Key (KEK) is typically a secret credential that wraps or encrypts a MEK and is presented as a credential to take action; for example, using the MEK as with unlocking encrypted data; or on the MEK as with ordering the replacement of the MEK with a new MEK and thereby cryptographically erasing the OBJ. A KEK can, in some circumstances, be a user known password. In other cases, establishing the user and his authorization is tied to the use of a KEK that the user does not actually know.

User PoK may or may not include a plaintext KEK from the user; however, it always establishes the user identity in part by the PoK. For example, a relying party may require not only the username but a token (what you have) or a biometric (what you are) as well as a PoK (what you know). In some embodiments, the PoK may include an additional advanced capability test that is an additional complex PoK having to do with cognitive testing which reveals a complex knowledge state properly in the user's mind.

User Authorization PoK (APoK) is the part of the PoK that explicitly performs advanced capability tests on the user in order to authorize what may be considered dangerous activity.

A Requesting Party (RQP) is the entity providing the encryption management service to the user. As previously disclosed, the identity of the user need not be known by the PoK provider. Some encryption management service providers may use the PoK to lookup the KEK credential that they hold. In other cases, the PoK provider may hold these KEK credentials for the RQP and the User.

An Authorization Token (AT) is the result of a PoK test. Such a test may yield various ATs sent from the PoK service to the RQP. These include "Allow Full Authorization," "Read Only Authorization Requested," "Failure to Authorize," "Failure to Authorize—too Many Attempts," etc.

A Category Selection Token (CST) may be used when the RQP optionally requests the user to select a test from a category of tests, which the user may choose to take. By putting the onus on the user, privacy is preserved as to why the user's action may have caused a particular AT.

The systems and methods described herein may be implemented and performed in many different environments and on different types of devices. FIG. 1 illustrates an example of a generic computing device and a generic mobile device, according to some embodiments of the present disclosure.

As shown in FIG. 1, generic computing device 10 includes one or more processors 12 connected to a communication bus 14. Also connected to this bus 14 are a short-term memory 16 (such as DRAM and other types of volatile storage) and a long-term storage 18 (such as hard drive, solid state drives, and other types of non-volatile storage). A user input 20 (such as a mouse or touch screen) and a communication interface 22 (for Ethernet, Wi-Fi, LTE, Bluetooth, and other types of communication) are also included. Depending on the computing device 10, an audio input 24 (such as a microphone), visual input 26 (such as a camera or video recorder), audio output 28 (such as a speaker), and visual output 30 (such as a display) are also connected via the bus 14 to the processor 12.

Also shown in FIG. 1, the computing device 10 may include a mechanism for location determination 32 (such as a GPS or AGPS chip), an ability to connect to external storage 34 (such as external hard drives and flash drives), and other various slots and ports 36 (such as USB and serial ports and SD card readers).

FIG. 1 also shows a generic mobile device 60 which includes one or more processors 62 connected to a communication bus 64. Also connected to this bus 64 are a short-term memory 66 (such as DRAM and other types of volatile storage) and a long-term storage 68 (such as hard drive, solid state drives, and other types of non-volatile storage). A user input 70 (such as a mouse or touch screen) and a communication interface 72 (for Ethernet, Wi-Fi, LTE, Bluetooth, and other types of communication) are also included. Depending on the mobile device 60, an audio input 74 (such as a microphone), visual input 76 (such as a camera or video recorder), audio output 78 (such as a speaker), and visual output 80 (such as a display) are also connected via the bus 64 to the processor 62.

Also shown in FIG. 1, the mobile device 60 may include a mechanism for location determination 82 (such as a GPS or AGPS chip), an ability to connect to external storage 84 (such as external hard drives and flash drives), and other various slots and ports 86 (such as USB and serial ports and SD card readers). A communications network 90 allows for communication between the computing device 10 and the mobile device 60 via the communication interface 22 and the communication interface 72.

Figure 2:
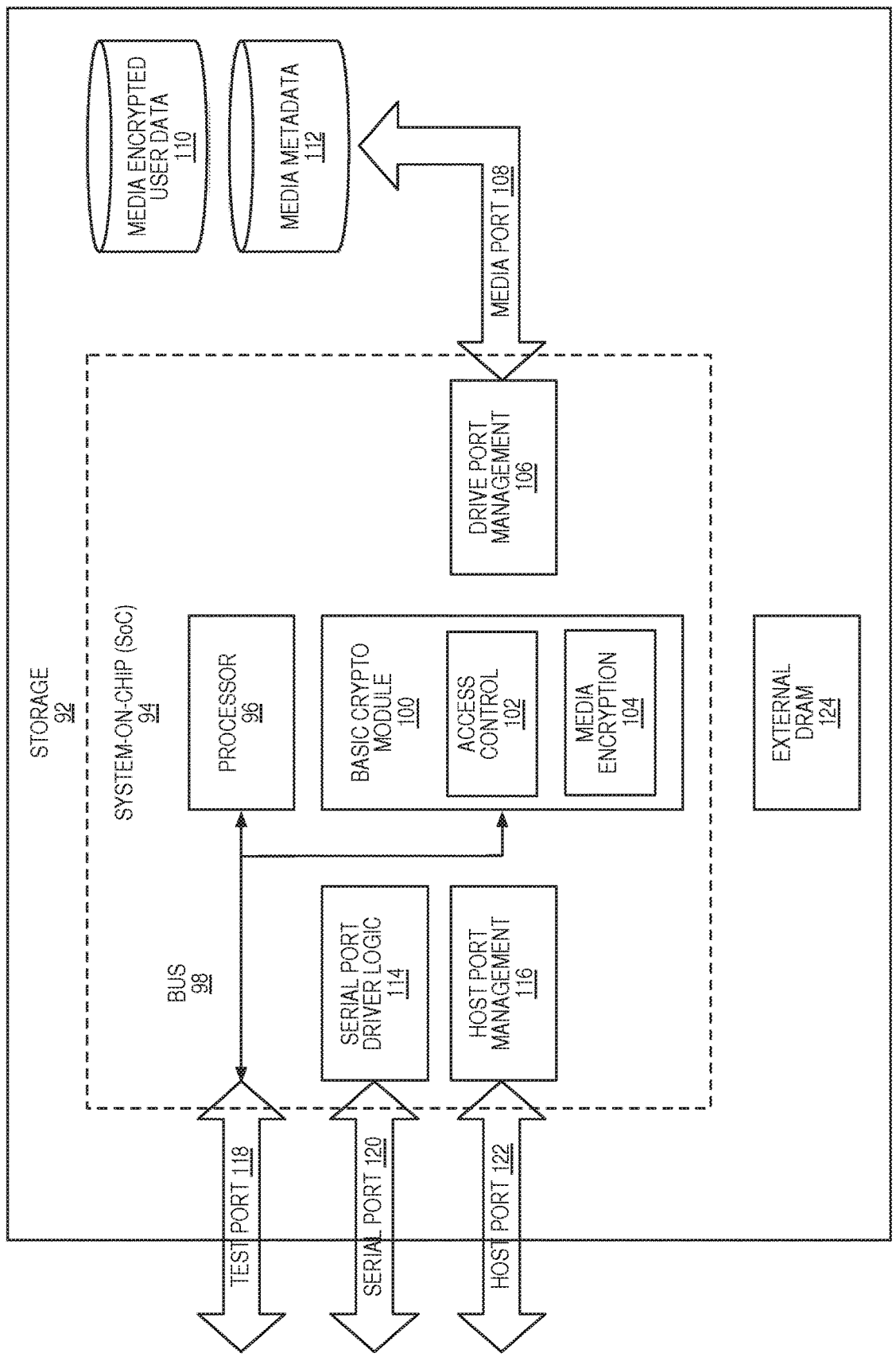
FIG. 2 illustrates a storage device, according to some embodiments of the present disclosure.

As discussed above, a storage device may be any OBJ such as an entire drive, a partition of a drive, storage objects, a document, or sentences from a document that are stored separately. FIG. 2 illustrates an exemplary storage device, according to some embodiments of the present disclosure. The storage device of FIG. 2 is a Self-Encrypting Drive (SED). Some SEDs conform to the Opal and Enterprise standards developed by the Trusted Computing Group (TCG). Key management takes place within the hard disk controller, and in some embodiments the encryption keys are 128 or 256 bit Advanced Encryption Standard (AES) keys.

As shown, storage device 92 includes a System on a Chip (SoC) 94. This SoC 94 includes one or more processors 96 connected to a communications bus 98. Also connected to the communications bus 98 is a basic cryptographic module 100 which includes at least an access control module 102 and a media encryption module 104.

SoC 94 also includes drive port management 106 which is connected to a media port 108. Media port 108 is connected to media encrypted user data 110 and to media metadata 112. SoC 94 also includes a serial port driver logic 114 and a host port management module 116. In some embodiments, connections to the storage device 92 may be through a test port 118 directly to the communications bus 98, through a serial port 120 to the serial port driver logic 114, and/or through a host port 122 to the host port management module 116. In some embodiments, as is shown in FIG. 2, the storage device 92 may also contain an external Dynamic Random Access Memory (DRAM) 124 that is external to the SoC 94 but still contained in the storage device 92.

Computing device 10 is intended to represent various forms of digital computers, such as laptops, desktops, workstations, personal digital assistants, servers, blade servers, mainframes, and other appropriate computers. Mobile device 60 is intended to represent various forms of mobile devices, such as personal digital assistants, cellular telephones, smart phones, and other similar computing devices. The components shown here, their connections and relationships and their functions, are meant to be exemplary only and are not meant to limit embodiments disclosed herein.

A picture password system has previously been described which is also capable of publishing arbitrary cognitive testing in U.S. Provisional Patent Application No. 62/006,472 entitled "Advanced Proofs of Knowledge for the Web," the disclosure of which is hereby incorporated herein by reference in its entirety. A similar system was also described in the non-confidential pre-publication version of an academic paper submitted to the IEEE entitled "Completely Refactoring User Authentication," the disclosure of which is hereby incorporated herein by reference in its entirety. In some embodiments, the picture password system enforces snap to grid touches and motions to previously uploaded or provided images. An image can be a cognitive test with a multiple choice and an optional timer. As such, the same system that provides for picture passwords and text passwords can also provide for publishing of arbitrary cognitive tests which are easy to construct and which can be constructed in automated ways from image material. As used herein, such a system is referred to as a PoK server.

Figure 3:
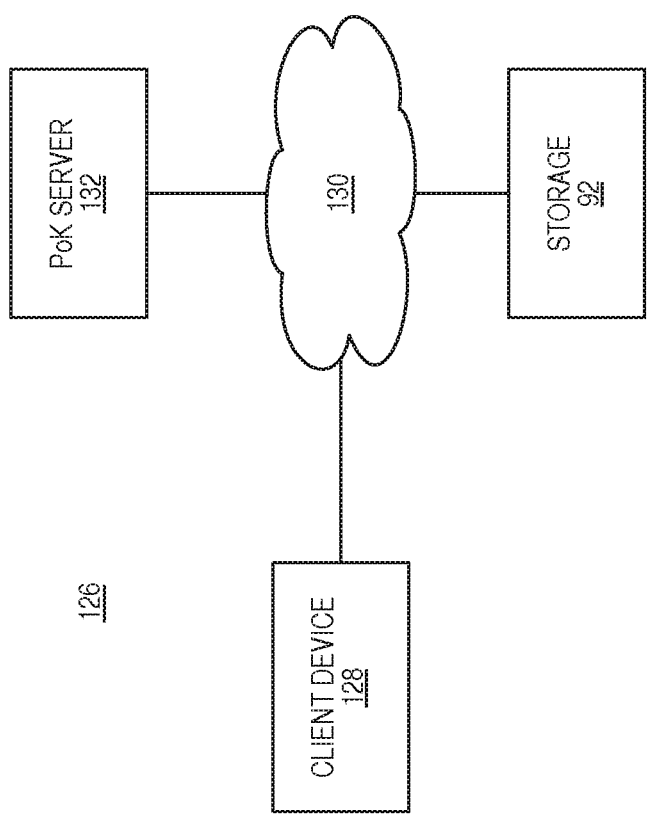
FIG. 3 illustrates a relationship between a client device, a storage device, and an external Proof of Knowledge (PoK) server, according to some embodiments of the present disclosure.

FIG. 3 illustrates a relationship between a client device, a storage device, and an external Proof of Knowledge (PoK) server, according to some embodiments of the present disclosure. FIG. 3 illustrates a system 126 where a client device 128 connects through a communications network 130 to both a PoK server 132 and the storage device 92. In this example, the PoK server 132 is external to the storage device 92.

Figure 4:
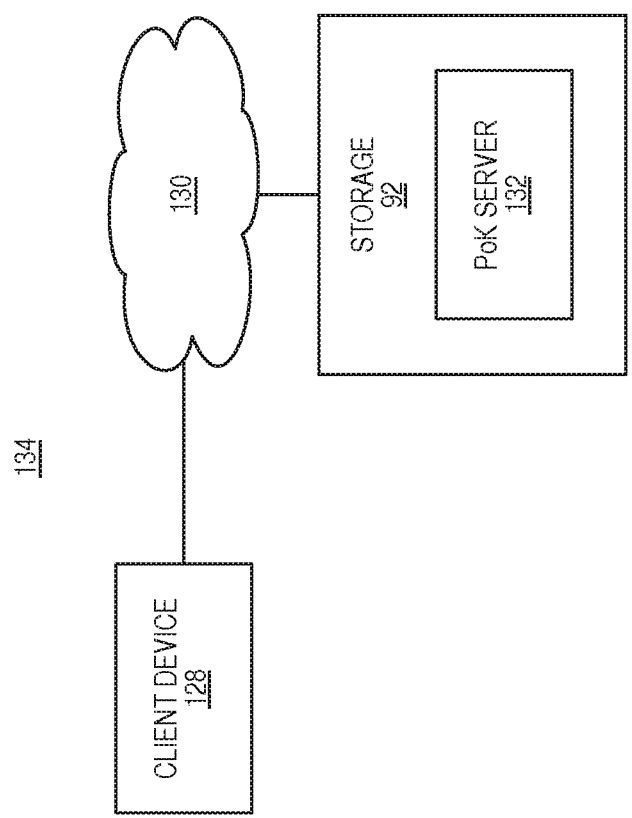
FIG. 4 illustrates a relationship between a client device and a storage device with an internal PoK server, according to some embodiments of the present disclosure.

Another exemplary system 134 is shown in FIG. 4 which illustrates a relationship between the client device 128 and the storage device 92 with an internal PoK server 132, according to some embodiments of the present disclosure. Since this PoK server 132 is internal to the storage device 92, it may be easier to transport the storage device 92 or to use the storage device 92 without requiring a connection to an external PoK server 132. More generally, the OBJs may be protected by hardware, and similarly the hardware drive, for example a Solid State Drive (SSD) SED drive, may itself provide this logon and testing technology in order to ensure that a proper PoK in addition to a provisioned identity may cause the hardware to change one or more MEKs protecting data on the drive (or Storage Area Network (SAN)). This provides portability of this solution whether the hardware is moved to different environments.

Figure 5:
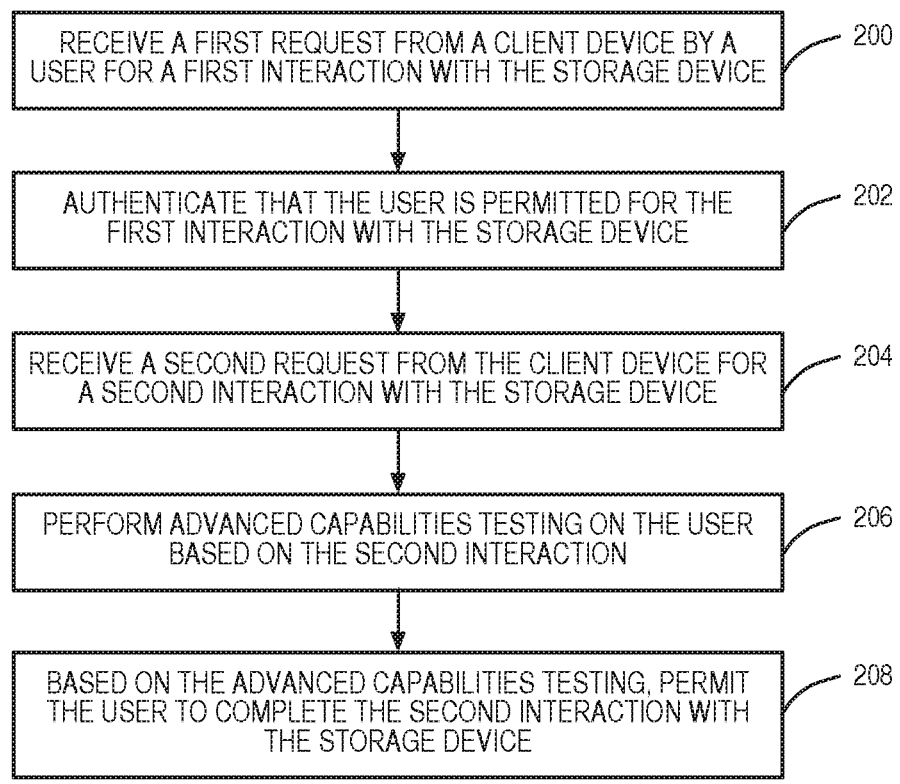
FIG. 5 illustrates a process for providing encryption management for storage devices, according to some embodiments of the present disclosure.

FIG. 5 illustrates a process for providing encryption management for storage devices, according to some embodiments of the present disclosure. The storage device 92 receives a first request from a user for a first interaction with the storage device 92 (step 200). In some embodiments, this interaction may include a request to query the storage device 92, read the storage device 92, write to the storage device 92, or even to erase the storage device 92.

The storage device 92 then authenticates that the user is permitted for the first interaction with the storage device 92 (step 202). In some embodiments, the first interaction with the storage device (92) involves a request to unlock the storage device (92). More details regarding this authentication will be discussed below. In some embodiments, the storage device 92 receives a second request from the client device for a second interaction with the storage device 92 (step 204). In some embodiments, this second interaction may be an action that the user is permitted to do, but extra caution may be needed such as when the user has requested to cryptographically erase the storage device 92 by deleting decryption keys. The storage device 92 performs advanced capabilities testing on the user based on the second interaction (step 206). Again, more details regarding this step are discussed below. Based on the advanced capabilities test results, the storage device 92 may permit the user to complete the second interaction with the storage device 92 (step 208).

In some embodiments, it may not be necessary to perform advanced capabilities testing on the user. For instance, performing the advanced capabilities testing may also include determining if it is necessary to perform advanced capabilities testing on the user based on the second interaction with the storage device 92, a previous advanced capabilities testing, a device used to access to the storage device 92, and/or the user. For instance, this might include determining not to perform advanced capabilities testing if advanced capabilities testing has already been performed successfully within a predefined time period. The predefined time period may be based on the second interaction. For instance, erasing the storage device 92 may require more frequent advanced capabilities testing than merely writing to the storage device 92. In some embodiments, it may be determined to always perform advanced capabilities testing based on the second interaction.

Figure 6:
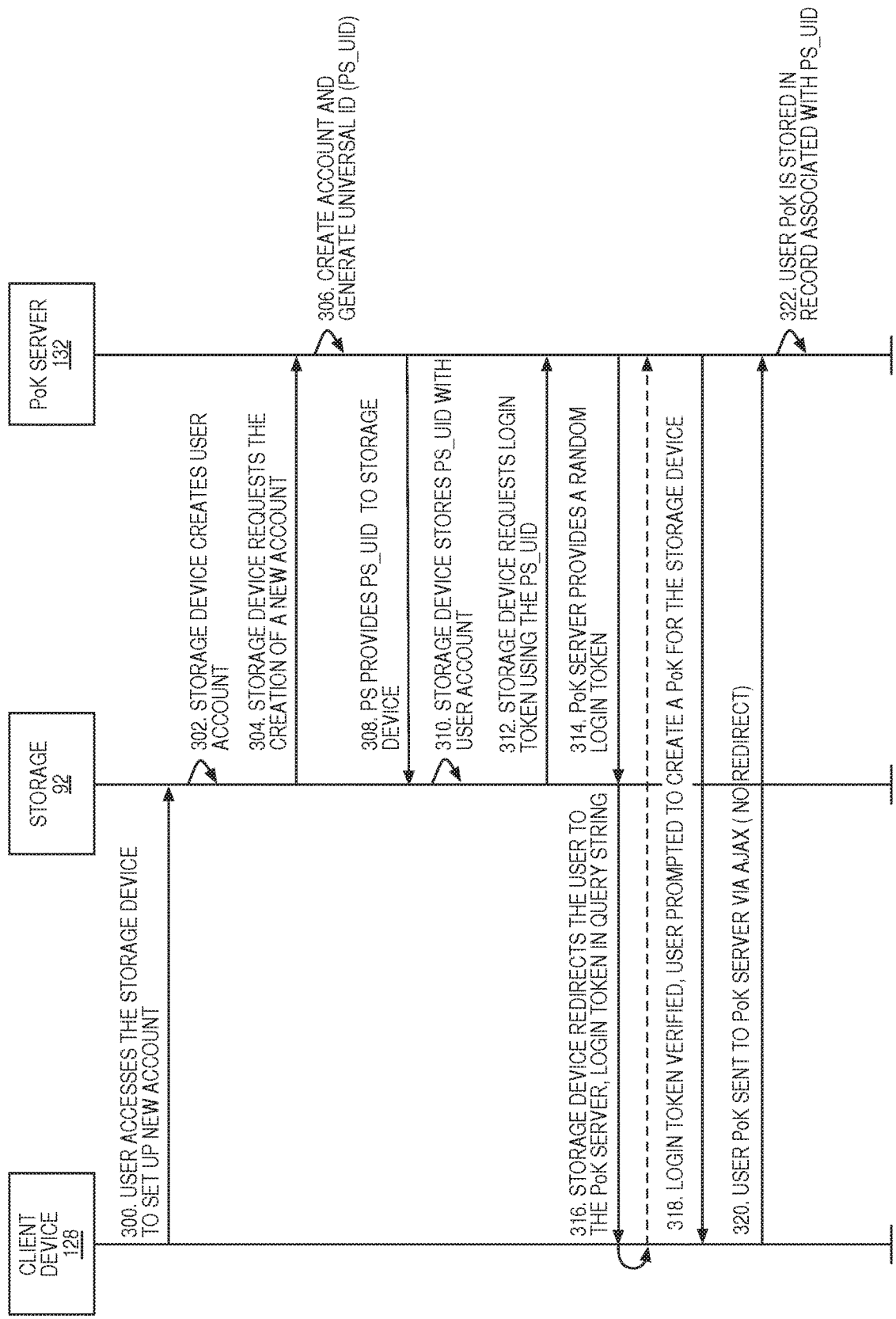
FIG. 6 illustrates a user creating a new account to access a storage device, according to some embodiments of the present disclosure.

FIG. 6 illustrates a user creating a new account to access a storage device, according to some embodiments of the present disclosure. A user at client device 128 accesses the storage device 92 to set up a new account (step 300). The storage device 92 creates a new user account locally (step 302) and requests the creation of a new account at the PoK server 132 (step 304). As a reminder, the PoK server 132 may be connected to the storage device 92 through some communications network or may be included internally in the storage device 92. The PoK server 132 creates an account and generates a universal ID (PS_UID) to identify the user (step 306).

The PoK server 132 provides the universal ID to the storage device 92 (step 308) which stores the universal ID with the user account (step 310). The storage device 92 then requests a login token from the PoK server 132 using the universal ID (step 312). The PoK server 132 provides a random login token to the storage device 92 (step 314) which then redirects the user at the client device 128 to the PoK server 132 with the login token in the query string (step 316). At this point, the client device 128 is communicating directly with the PoK server 132. When the PoK server 132 verifies the login token, the user at the client device 128 is prompted to create a PoK for the storage device 92 (step 318). In this example, the user's PoK is sent to the PoK server 132 via Asynchronous JavaScript and XML (AJAX) or some other method that prevents redirection (step 320). The PoK server 132 stores the user's PoK in a record associated with the universal ID of the user (step 322). In some embodiments, the PoK server 132 stores a hash of the user's PoK. In this respect, the PoK server 132 does not know what the user's PoK is, but can compare it to a subsequent PoK to determine a match for authentication.

The type of PoK established might depend on the security requirements of the system and the capabilities of the system. Some examples of PoKs would be plaintext passwords, picture passwords, video passwords, etc. Also, since the PoK server 132 may be included internally within the storage device 92, some of the previously described interactions may be simplified or omitted depending on implementation. For instance, there might not be two separate account creation steps as in Steps 302 and 306. In some embodiments, there are no usernames, but only a fixed number of potential passwords or PoKs. In these embodiments, provisioning may consist of identifying one of the password slots that has not been used and provisioning that for the user.

Figure 7:
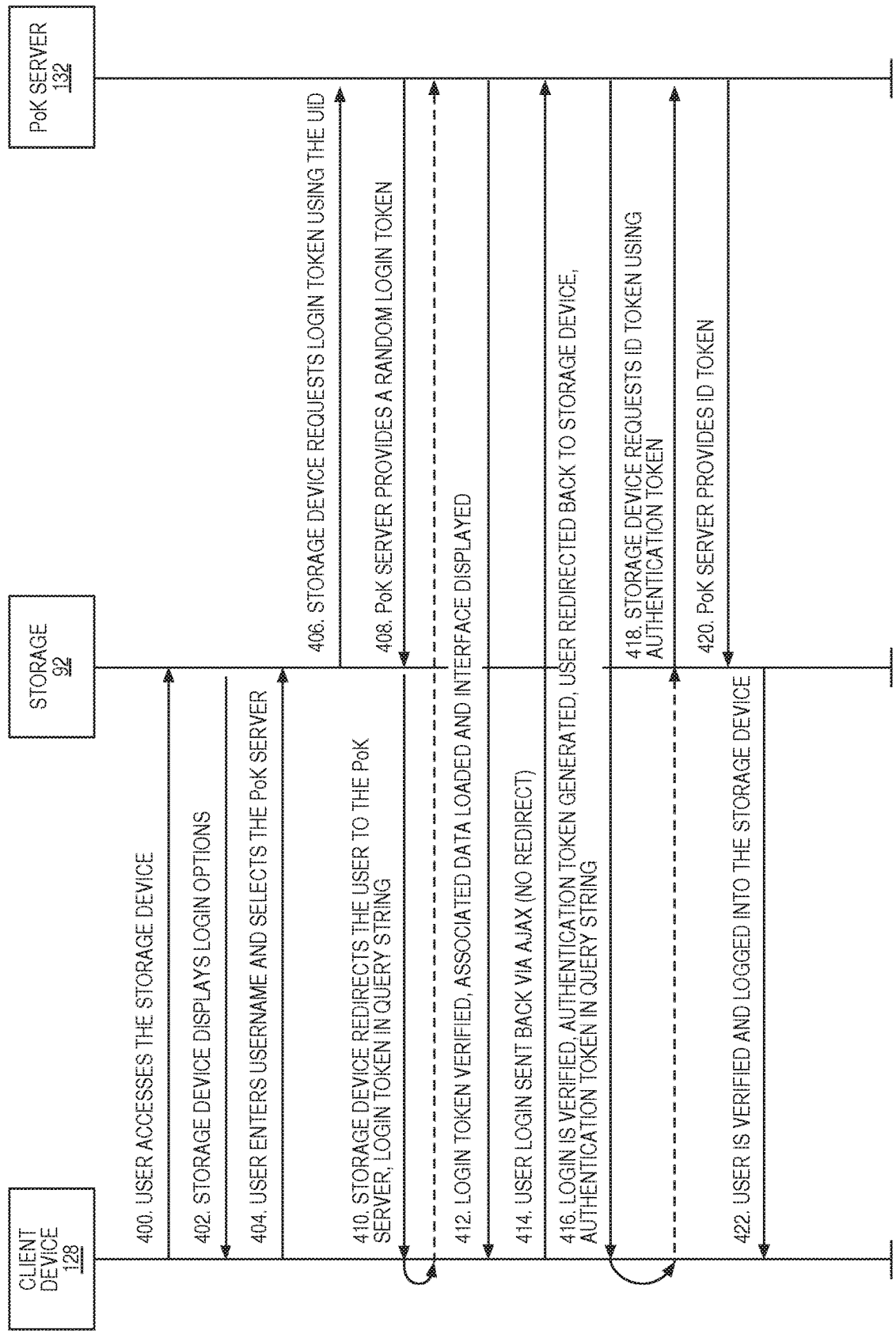
FIG. 7 illustrates a user attempting to access a storage device and being authenticated by the PoK server, according to some embodiments of the present disclosure.

When a user wishes to access or interact with the storage device 92, several checks must be performed to ensure that such access is permitted. FIG. 7 illustrates a user attempting to access the storage device 92 and being authenticated by the PoK server 132, according to some embodiments of the present disclosure. First, a user at client device 128 accesses the storage device 92 (step 400). The storage device 92 displays login options to the user (step 402). In some embodiments, the login options comprise a plurality of potential PoK servers to use for authentication. The user enters a username and selects the PoK server 132 (step 404). As discussed above, in some embodiments, the PoK server 132 is internal to the storage device 132. Even so, there may be more than one PoK server available either internally or externally to use for authentication of the user.

The storage device 92 requests a login token from the PoK server 132 using the universal ID associated with the user accessing the storage device 92 (step 406). The PoK server provides a random login token to the storage device 92 (step 408) which redirects the user to the PoK server 132 with the login token in the query string (step 410). At this point, the client device 128 is communicating directly with the PoK server 132. When the PoK server 132 verifies the login token, associated data is loaded and an appropriate interface is displayed (step 412). In this example, the user's login is sent to the PoK server 132 via AJAX or some other method that prevents redirection (step 414). In some embodiments, a hash of the PoK is sent to the PoK server. When the PoK server 132 verifies the login, an authentication token is generated, and the user is redirected back to the storage device 92 with the authentication token in the query string (step 416).

The storage device 92 requests an ID token from the PoK server 132 using the authentication token (step 418). The PoK server 132 provides the ID token that corresponds to the authentication token to the storage device 92 (step 420). At this point, the user is verified and logged into the storage device 92 (step 422).

The process described in FIG. 7 allows some assurance that the user is who the user claims to be and is permitted to access the storage device 92. However, as discussed above, even if the user is authenticated to access the storage device 92, that may not be enough protection against unintentional modification or destruction of data stored on the storage device 92. As such, in some embodiments, there are additional checks of the user. Some of these additional checks depend on the type of interaction the user has requested with the storage device 92, how the user is connecting to the storage device 92, how long it has been since the user was last tested, etc.

FIG. 8 illustrates the user attempting to access the storage device 92 and being subjected to advanced capabilities testing by the PoK server 132, according to some embodiments of the present disclosure.

First, a user at client device 128 attempts interaction with the storage device 92 (step 500). At this point, the user may already have been authenticated, or this might still need to be performed, depending on implementation. The storage device 92 indicates to the user at client device 128 that advanced capability testing is required (step 502) and requests an advanced capability token from the PoK server 132 using the universal ID of the user (step 504). The PoK server 132 provides a random advanced capability token to the storage device 92 (step 506) which redirects the user to the PoK server 132 with the advanced capability token in the query string (step 508). At this point, the client device 128 is communicating directly with the PoK server 132. When the PoK server 132 verifies the advanced capability token, advanced capability tests are loaded, and an appropriate interface is displayed (step 510). In this example, the user's answers to the advanced capability tests are sent to the PoK server 132 via AJAX or some other method that prevents redirection (step 512). In some embodiments, the answers are hashed before they are sent back to the PoK server 132, and the verification of the answers by the PoK server 132 involves just a comparison of the received hash answer with the stored hash of the correct value. In this way, the PoK server 132 does not know the answers but can still provide validation. When the PoK server 132 verifies the advanced capability tests, an authentication token is generated and the user is redirected back to the storage device 92 with the authentication token in the query string (step 514).

The storage device 92 requests an access token from the PoK server 132 using the authentication token (step 516). The PoK server 132 provides the access token that corresponds to the authentication token to the storage device 92 (step 518). At this point, the user is now granted access to the interactions attempted on the storage device 92 (step 520). Depending on the interactions requested, the user may now erase the drive, reset the keys, etc. (step 522).

The advanced capability test may be used in many ways and for many different purposes. One example is that before a potentially irreversible interaction with the storage device 92, the user is at least made aware of the potential for unintended consequences. This advanced capability test is also sometimes referred to as a cognitive test.

In some embodiments, this cognitive test may be performed as part of an APoK that is part of the PoK platform, which includes multiple choice tests (which involve a single touch or click on the image), typed tests which involve entering text, etc. In some embodiments, this advanced capability testing can be combined in a single experience to the user along with the PoK component needed to identify the user (the actual password), or may appear after the person has proven identity. Since the PoK server 132 does not need to know the identity of the user, it is not material whether the identity PoK precedes the advanced capability test or is cotemporaneous with it.

As previously disclosed an APoK has three basic forms, "just ask directly," "a performance test," and a "diversion".

For the sake of a concrete example, a user may attempt to interact with storage device 92 with the power to cryptographically erase data. This can be a very useful way of destroying data and/or preparing a storage device 92 to be used in some other way. Alternatives often involve multiple overwrites of data in specific patterns to assure data destruction. If a decryption key is erased, no such overwriting is necessary. However, an accidental error is that the user accidently performs a successful erase but doesn't fully realize the significance of the act. A malicious error is one in which the user intentionally makes the error precisely in order to deny others access to the data.

There are various categories of test that may either voluntarily be selected by the user from a catalogue or submitted by the RQP in a session CST to request a catalogue selection from a subset of a catalogue of APoKs, or a catalogue selection enforced by the organization on logging in with a role. A multiple password capability is described in International Patent Application PCT/US16/20670 entitled "Method and System for a Multiple Password Web Service and Management Dashboard," filed Mar. 3, 2016, the disclosure of which is hereby incorporated herein by reference in its entirety. The multiple password capability shows how roles can be assigned to different passwords for the same user. The parameterization of catalogue entries has also been described in the multiple password disclosure.

For these tests, another type of control is introduced which is the frequency of testing under the role. For example, a user may be tested only once a day with the user's answers persistent when coming from the same device and browser or application for the rest of the day. In some embodiments, depending on the interaction requested, the user may be tested regardless of whether or not the user has been tested recently.

Cryptographic Erase Catalogue entries for "Just Ask"
Several types of just ask APoKs can be selected among:
Just a warning and a question:
  You are about to login to Erase Data. Are you sure you want to do this?
  YES NO
An informative warning with the question:
  You are about to login to Erase Data. This action is permanent and cannot be taken back. If you believe there is data that is important save, are you sure you have another copy? Are you sure you have access to that other copy? Have you double checked to make sure you can read it? Are you sure you want to do this?
  YES NO
A full blown teaching session with several screens, including first teaching screens with a test to follow:
  1) You are about to login to Erase Data. This action is permanent and cannot be taken back.
  Do you believe there is data that is important save?
  YES NO
  2) Are you sure you have another copy?
  YES NO
  3) Are you sure you have access to that other copy?
  YES NO
  4) Have you double checked to make sure you can read it?
  YES NO
  5) Are you aware that even unintentional erasure of critical data that is not recoverable can result in your immediate termination with the company?
  YES NO
Test:
  Are you sure you want to do this?
  YES NO
If the user believes that there is important data and says yes to any of the middle questions 2-4, access can be denied to this authorization.

Performance Tests:
A performance APoK may include a reaction time test that provides self-assurance that the person is clearly functioning normally. For example, this may be a test designed to determine if the person is intoxicated or otherwise not fully appreciative of the consequences of the user's own actions.

Other proofs of knowledge are also possible. Situational tests may determine if the person knows about areas which he should know if he is authorized; for example, the color that best matches the color of the paint in a particular room.

Also, a performance test may include a known daily challenge response pair with a brief timeout (e.g., 15 seconds). This test can be restricted to once a day and applied to the whole day depending on policy associated with this test.

Such performance tests cannot be anticipated by robots and cannot reasonably be passed by a robot, replacing the need for CAPTCHA.

Diversions:
Diversions can be employed to detect if the person wishes to send an alert token to indicate that he wishes to appear to have deleted the data, even if he has not. These were described in the "Advanced Proofs of Knowledge for the Web" disclosure referred to above.

Diversions are also suited to trapping insider threats. For example:
  Are you aware it is felony to impersonate someone and that this session requires the camera on this laptop be turned on for you to go further? (P.S. whether the camera is turned on or not . . . making this a diversion).
  YES NO
Motion Video
These tests can also involve motion video/animation and/or sound with latencies as disclosed in "Method and System for Processor or Web Logon" disclosure referred to above.

Those skilled in the art will recognize improvements and modifications to the preferred embodiments of the present disclosure. All such improvements and modifications are considered within the scope of the concepts disclosed herein and the claims that follow.

What is claimed is:
1. A method of operation of a storage device, comprising:
  receiving a first request from a client device by a user for a first interaction with the storage device;
  authenticating that the user is permitted for the first interaction with the storage device;
  receiving a second request from the client device for a second interaction with the storage device;
  determining if it is necessary to perform advanced capabilities testing on the user based on at least one of the group consisting of the second interaction with the storage device, a previous advanced capabilities testing, a device used to access to the storage device, and the user;
  performing the advanced capabilities testing on the user based on the second interaction while the user is still authenticated for the first interaction with the storage device, where the advanced capabilities testing has to do with cognitive testing indicative of a complex knowledge state of the user; and
  based on the advanced capabilities testing, permitting the user to complete the second interaction with the storage device;
  wherein performing the advanced capabilities testing on the user based on the second interaction comprises:
    requesting an advanced capabilities token from a proof of knowledge server corresponding to the user;
    redirecting the user to the proof of knowledge server including the advanced capabilities token;
    receiving an authentication token from the client device;
    requesting an access token from the proof of knowledge server using the authentication token; and permitting the user to complete the second interaction with the storage device comprises determining that the access token permits the second interaction;

wherein the access token indicates that the user is permitted to have at least one of the group consisting of query-only access to the storage device, read-only access to the storage device, write access to the storage device, and erase access to the storage device.

2. The method of claim 1 wherein authenticating that the user is permitted for the first interaction with the storage device comprises querying the proof of knowledge server within the storage device.

3. The method of claim 1 wherein authenticating that the user is permitted for the first interaction with the storage device comprises querying the proof of knowledge server external to the storage device.

4. The method of claim 2 wherein querying the proof of knowledge server comprises:
requesting a login token from the proof of knowledge server corresponding to the user;
redirecting the user to the proof of knowledge server including the login token; and
receiving the authentication token from the client device.

5. The method of claim 1 wherein determining if it is necessary to perform the advanced capabilities testing comprises determining not to perform the advanced capabilities testing if the advanced capabilities testing has already been performed successfully within a predefined time period.

6. The method of claim 5 wherein the predefined time period is based on the second interaction with the storage device.

7. The method of claim 1 wherein determining if it is necessary to perform the advanced capabilities testing comprises determining to always perform advanced capabilities testing based on the second interaction with the storage device.

8. The method of claim 1 wherein the storage device is a self-encrypting drive.

9. The method of claim 1 wherein the storage device is one of the group consisting of an entire storage drive, a partition of a storage drive, a file, a storage object, and a document.

10. A storage device comprising:
a data storage; and
circuitry configured to:
receive a first request from a client device by a user for a first interaction with the storage device;
authenticate that the user is permitted for the first interaction with the storage device;
receive a second request from the client device for a second interaction with the storage device;
determine if it is necessary to perform advanced capabilities testing on the user based on at least one of the group consisting of the second interaction with the storage device, a previous advanced capabilities testing, a device used to access to the storage device, and the user;
perform the advanced capabilities testing on the user based on the second interaction while the user is still authenticated for the first interaction with the storage device, where the advanced capabilities testing has to do with cognitive testing indicative of a complex knowledge state of the user; and
based on the advanced capabilities testing, permit the user to complete the second interaction with the storage device;
wherein performing the advanced capabilities testing on the user based on the second interaction comprises being configured to:
request an advanced capabilities token from a proof of knowledge server corresponding to the user;
redirect the user to the proof of knowledge server including the advanced capabilities token;
receive an authentication token from the client device;
request an access token from the proof of knowledge server using the authentication token; and
permit the user to complete the second interaction with the storage device determining that the access token permits the second interaction;
wherein the access token indicates that the user is permitted to have at least one of the group consisting of query-only access to the storage device, read-only access to the storage device, write access to the storage device, and erase access to the storage device.

11. The storage device of claim 10 wherein authenticating that the user is permitted for the first interaction with the storage device comprises being configured to query the proof of knowledge server within the storage device.

12. The storage device of claim 10 wherein authenticating that the user is permitted for the first interaction with the storage device comprises being configured to query the proof of knowledge server external to the storage device.

13. The storage device of claim 11 wherein querying the proof of knowledge server comprises being configured to:
request a login token from the proof of knowledge server corresponding to the user;
redirect the user to the proof of knowledge server including the login token;
receive the authentication token from the client device.

14. The storage device of claim 10 wherein determining if it is necessary to perform the advanced capabilities testing comprises being configured to determine not to perform the advanced capabilities testing if the advanced capabilities testing has already been performed successfully within a predefined time period.

15. The storage device of claim 14 wherein the predefined time period is based on the second interaction with the storage device.

16. The storage device of claim 10 wherein determining if it is necessary to perform the advanced capabilities testing comprises being configured to determine to always perform the advanced capabilities testing based on the second interaction with the storage device.

17. The storage device of claim 10 wherein the storage device is a self-encrypting drive.

18. The storage device of claim 10 wherein the storage device is one of the group consisting of an entire storage drive, a partition of a storage drive, a file, a storage object, and a document.

* * * * *